(12) United States Patent
Larkin et al.

(10) Patent No.: US 12,532,087 B2
(45) Date of Patent: Jan. 20, 2026

(54) METHODS AND APPARATUSES FOR PROCESSING IMAGE DATA

(71) Applicant: Arm Limited, Cambridge (GB)

(72) Inventors: Daniel Larkin, Nottingham (GB); David Hanwell, Lancashire (GB)

(73) Assignee: Arm Limited, Cambridge (GB)

( * ) Notice: Subject to any disclaimer, the term of this patent is extended or adjusted under 35 U.S.C. 154(b) by 57 days.

(21) Appl. No.: 18/491,060

(22) Filed: Oct. 20, 2023

(65) Prior Publication Data

US 2024/0147086 A1 May 2, 2024

(30) Foreign Application Priority Data

Nov. 1, 2022 (GB) ..................................... 2216219

(51) Int. Cl.
| | |
|---|---|
| *H04N 23/667* | (2023.01) |
| *H04N 23/617* | (2023.01) |
| *H04N 23/65* | (2023.01) |
| *H04N 23/80* | (2023.01) |
| *H04N 25/47* | (2023.01) |
| *G06V 10/75* | (2022.01) |
| *G06V 10/82* | (2022.01) |
| *G06V 20/40* | (2022.01) |

(52) U.S. Cl.
CPC ........... *H04N 25/47* (2023.01); *H04N 23/617* (2023.01); *H04N 23/651* (2023.01); *H04N 23/667* (2023.01); *H04N 23/80* (2023.01); *G06V 10/758* (2022.01); *G06V 10/82* (2022.01); *G06V 20/44* (2022.01)

(58) Field of Classification Search
CPC .... H04N 23/61; H04N 23/611; H04N 23/617; H04N 23/651; H04N 23/667; H04N 23/80; H04N 25/47; G06V 10/758; G06V 10/82; G06V 20/44
See application file for complete search history.

(56) References Cited

U.S. PATENT DOCUMENTS

| | | |
|---|---|---|
| 2016/0301881 A1 | 10/2016 | Taggart et al. |
| 2017/0132466 A1 | 5/2017 | Gousev et al. |
| 2017/0228874 A1 | 8/2017 | Roberts |
| 2019/0138811 A1 | 5/2019 | Sohn et al. |
| 2020/0321374 A1* | 10/2020 | Ion ........................... G06N 3/04 |

(Continued)

FOREIGN PATENT DOCUMENTS

| | | |
|---|---|---|
| CN | 108647592 A | 10/2018 |
| CN | 107506734 B | 7/2020 |

(Continued)

*Primary Examiner* — Daniel M Pasiewicz
(74) *Attorney, Agent, or Firm* — Leveque Intellectual Property Law, P.C.

(57) ABSTRACT

The present disclosure relates to a method of processing image data at an apparatus having an image sensor, a first statistics data module and a first processor component, the method comprising: obtaining, at the first statistics data module from the image sensor, first image sensor data; generating, at the first statistics data module, statistics data of a first type derived, at least in part, from the first image sensor data; processing, at the first processor component, the statistics data of the first type to determine whether or not an event is detected in a scene; generating, at the first processor component, an event signal when an event is detected.

17 Claims, 7 Drawing Sheets

(56) References Cited

U.S. PATENT DOCUMENTS

| | | |
|---|---|---|
| 2020/0327313 A1 | 10/2020 | Kedarisetti et al. |
| 2022/0188560 A1* | 6/2022 | Dharia .................. H04N 23/45 |
| 2022/0215198 A1 | 7/2022 | Panda et al. |
| 2024/0089622 A1* | 3/2024 | Kale .................... H04N 23/617 |

FOREIGN PATENT DOCUMENTS

| | | |
|---|---|---|
| EP | 3008891 B1 | 4/2016 |
| WO | 2014074139 A1 | 5/2014 |

* cited by examiner

METHODS AND APPARATUSES FOR PROCESSING IMAGE DATA

The present technology relates generally to methods and apparatuses for processing image data.

Image processing systems are used to process image frames generated by an image sensor using computer algorithms resulting from the detection of photons from a scene in an environment in which the sensor is located.

It can sometimes be a challenge to implement image processing functionality on resource constrained devices and apparatuses.

In view of the foregoing considerations, an aspect of the present technology provides a method of processing image data at an apparatus having an image sensor, a first statistics data module and a first processor component, the method comprising: obtaining, at the first statistics data module from the image sensor, first image sensor data; generating, at the first statistics data module, statistics data of a first type derived, at least in part, from the first image sensor data; processing, at the first processor component, the statistics data of the first type to determine whether or not an event is detected in a scene; generating, at the first processor component, an event signal when an event is detected.

In a further aspect there is provided an apparatus to process image data comprising: a statistics data module to: obtain, from an image sensor, image sensor data; generate statistics data derived, at least in part, from the image sensor data; provide, to a first processor component, the statistics data to enable the first processor component to determine whether or not an event is detected in a scene based on or in response to the statistics data.

A non-transitory computer-readable medium comprising machine-readable code which, when executed by a processor, causes the processor to perform the method of any of the appended method claims.

Embodiments will now be described, with reference to the accompanying drawings, in which.

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Figure 1:
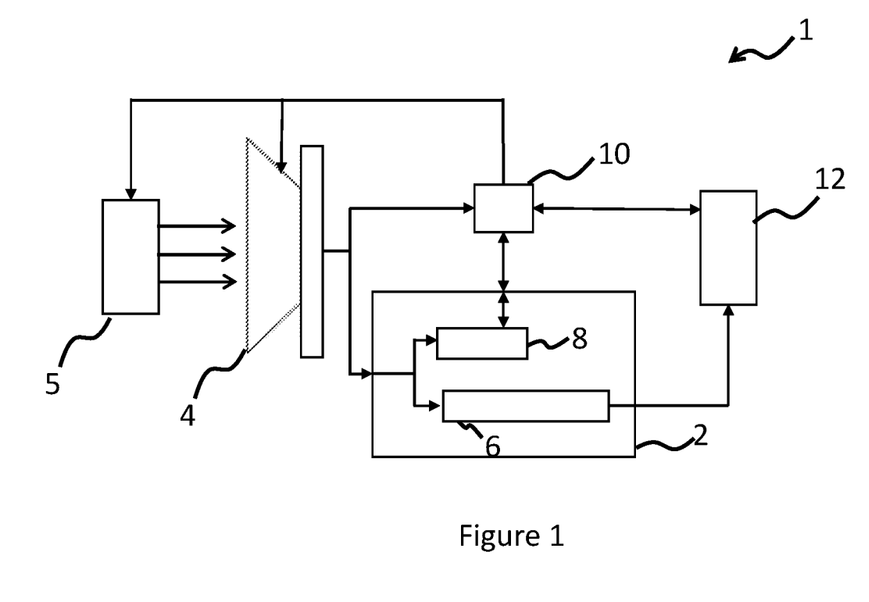
FIG. 1 shows an example of an apparatus to process image data.

FIG. 1 schematically shows an apparatus 1, where the apparatus is to process image data and comprises an image signal processor (ISP) 2, image sensor 4 and data consumer component 12.

The image sensor 4 is arranged to generate and output image sensor data representative of a scene in which the image sensor 4 is located. An optical lens may be provided to guide/focus the light from the scene onto the image sensor 4.

Image sensor 4 comprises a plurality of sensor pixels arranged in an array (e.g. in rows and columns). Each sensor pixel may comprise one or more photosensitive elements such as a photodiode that can convert incident light into electronic signals or data. The image sensor 4 may comprise charge-coupled device (CCD) technology or a complementary metal-oxide-semiconductor (CMOS) technology although any suitable photosensitive technology may be used. The array of sensor pixels could comprise 640×480 pixels up to tens of mega-pixels.

When monitoring a scene, the image sensor 4 generates initial sensor data comprising a plurality of pixel values (initial sensor pixel values), where the plurality of initial sensor pixel values may be arranged in an array (e.g. an array of rows and columns and comprising one or more channels) corresponding to the sensor pixels.

Such an array of initial sensor pixel values in the initial sensor data corresponds to an image frame generated or captured by the image sensor 4 and a pixel value in the initial sensor pixel values of the initial sensor data may represent at least one characteristic of the light in the scene captured by a corresponding sensor pixel.

As will be appreciated, when capturing a plurality of frames (e.g. as part of a video stream) a corresponding plurality of arrays of initial sensor pixel values will be generated as the initial sensor data. Thus, the arrays of initial sensor pixel values of the initial sensor data may be generated on a per-frame basis.

In general, the initial sensor pixel values of an array of initial sensor data may represent any photometric quality or characteristic that may be used to represent the visual appearance of the corresponding image captured by the image sensor data.

For example, and as above, an intensity pixel value may represent a luminance of the light captured by the corresponding sensor pixel, which is, for example, a measure of the intensity of light per unit area rather than an absolute intensity. In another example, a brightness value may be representative of a brightness light captured by the corresponding sensor pixel, which may be considered to correspond to a perception of a luminance, which may be proportional to the luminance. In another example the pixels values may be coded with Bayer filter colors. In another example, the arrays of initial sensor data may comprise one or more channels, each channel relating to a different pixel colour.

The size of an array of initial sensor pixel values of the initial sensor data is taken to be the no. of pixels along the length of the array x the no. of pixels along the width of the array, where the number of pixels values in the array is taken to be the resolution thereof.

Furthermore, the initial sensor data comprising the arrays of initial sensor pixel values may be generated at a frame rate corresponding to the rate at which the image sensor captures the image frames.

The image sensor 4 outputs image sensor data for processing by ISP 2.

The image sensor data also comprises arrays of image sensor pixel values which correspond to the arrays of initial sensor pixel values of the initial sensor data. Whilst the arrays of image sensor pixel values of the image sensor data may have substantially the same characteristics (e.g. size, resolution, channels etc.) as the arrays of initial sensor pixel values of the initial sensor data, the image sensor may process the initial sensor data to modify it in some manner as required for a particular application of the ISP 2 and/or to place the image sensor data into a format suitable for processing by the ISP 2.

For example, the image sensor 4 may output the image sensor data in any suitable format. For example, the image sensor 4 may output the image sensor data in Bayer format, which is associated with arrangement of an array of colour filters of Red, Green, and Blue (RGB) on the photosensitive area although the claims are not limited in this respect. In a further example the image sensor data may be output in monochrome.

The ISP 2 includes one or more image processing blocks 6 comprising circuitry to process the received image sensor data in accordance with one or more algorithms, whereby these algorithms are used to generate data in a suitable format for the consumer component 12. For example, the one or more image processing blocks 6 may provide, for example, denoising functionality, demosaicing functionality, colour management functionality, or tone-mapping functionality.

Firmware to control the one or more image processing blocks 6 in accordance with the one or more algorithms may run on a further processor component 10 within the apparatus 1. For example, the further processor component 10 may be a compute device such as a central processing unit (CPU), microcontroller (MCU), neural processing unit (NPU), an application-specific integrated circuit (ASIC) or any suitable compute device.

In the example described in FIG. 1, the ISP 2 comprises fixed-function hardware with a pipelined architecture.

The one or more image processing blocks 6 process the image sensor data to generate ISP image data (e.g. an image or streams of images of the RGB space domain) which is provided to a consumer component 12. The consumer component 12 may, for example be a hardware and/or software component such as, for example, a display, video encoder or storage although the claims are not limited in this respect.

Whilst such functionality can achieve relatively high throughput for processing the image sensor data (e.g. outputting up to 2 billion ISP output pixel values per second (2Gpix/s) as ISP image data) the pipelined architecture of the ISP means that a typical image processing block 6 within the ISP 2 has access to only a portion of the image sensor data received from the image sensor—typically only tens of rows of image sensor pixel values per array of the stream of arrays of image sensor pixel values. Thus, an image processing block 6 may not have access to a whole array of image sensor pixel values corresponding to a whole or full frame captured by the image sensor 4.

Some image-processing and camera-control functions (e.g. algorithm control, image sensor control, lens control) require information about the whole frame—for example an auto-exposure algorithm usually needs a histogram of pixel intensities obtained from the whole frame to accurately control one or more of such functions, but as an individual image processing block is not capable of processing all of the pixel data of a whole frame, the required information is obtained from statistics data generated by one or more statistics data modules 8.

The one or more statistics data modules 8 receive the image sensor data as an input, and using one or more algorithms, generate statistics data of one or more types derived, at least in part, from the image sensor data (e.g. by applying the one or more algorithms to an array of pixel values in the image sensor data), which the further processing component 10 uses to control the sensor 4, lens 5 and/or the functionality of the one or more processing blocks 6 to adjust the quality of the ISP image data. Thus, in operation, the derived statistics data may be used to adjust or select the algorithms to be used by the one or more processing blocks 6 in order to obtain a desired image quality when processed by a consumer component 12. For example, in order to obtain optimal pixel data use in the auto-focus statistics, it may be desirable to run an auto-exposure algorithm to maintain the sensor's gain and exposure time at appropriate values.

Examples of different types of statistics data generated by the one or more statistics data modules 8 include:

1. Auto-Exposure (AE) statistics data: AE statistics data comprises a global histogram of pixel intensities of the pixel values in the array, but sometimes also coarse (a relatively small number of bins) histograms of pixel intensities of the pixel values in several image zones in the array. AE statistics may be used to determine the exposure time and sensitivity that the image sensor 4 should use to avoid the resulting image being too bright or too dark. AE statistics data may also be used to program parameter values in the ISP processing blocks 6 to achieve optimal image quality from denoising or tone-mapping functions.
2. Auto-Focus (AF) statistics data: A band-pass filter is applied to the pixel values in the image sensor data and the resulting values accumulated over a grid of image zones to provide AF statistics data. When the filter is sensitive to certain high spatial frequencies, it provides a first response (e.g. a high response) when image content is sharply in focus and a different response (e.g. a low response) when objects are outside of the focal plane (too close to, or too far from the camera). The AF statistics data is intended to be used to focus the camera, usually by controlling the lens 5 via, for example, a voice coil motor or stepper motor (not shown).
3. Auto-White-Balance AWB statistics data: Some measure of hue (for example the ratios between colour channels) is computed for each pixel value in an array of the image sensor data and accumulated over a grid of image zones to generate the AWB statistics data which is then used (e.g. by firmware) to estimate the colour temperature of the light illuminating the scene, and so control come of the ISP's processing blocks colour settings.

It will be appreciated that the types of statistics data described above are exemplary only and any suitable statistics data may be used.

Generating image sensor data using an image sensor (e.g. a camera) and processing the image sensor data using the ISP 2 to generate ISP image data for a consumer component 12 and statistics data to control various functionality of the image sensor 4 and/or ISP 2 is relatively expensive from a resource perspective and is not conducive to being used for relatively low-power applications or by resource constrained devices.

For example, a home security camera would soon fill its memory if it constantly generated image sensor data in the form of video data. Similarly, a battery powered smart doorbell device would quickly drain its battery if its camera constantly ran capturing streams of video frames and generated image sensor data comprising corresponding arrays of pixel values.

One way that such an apparatus could reduce resource usage is by operating in a low-power mode, with a minimal subset of hardware being enabled, until some criterion has been met whereupon a wake-up signal is produced, causing the remaining hardware to become enabled. A technique for determining when it is appropriate for e.g. a smart doorbell to be idle and when to resume full functionality is to detect motion in its scene (for example caused by a new object or person entering the scene monitored by the camera).

One way to detect motion is use a passive infrared (PIR) sensor but such sensors tend to provide false positives.

Figure 2:
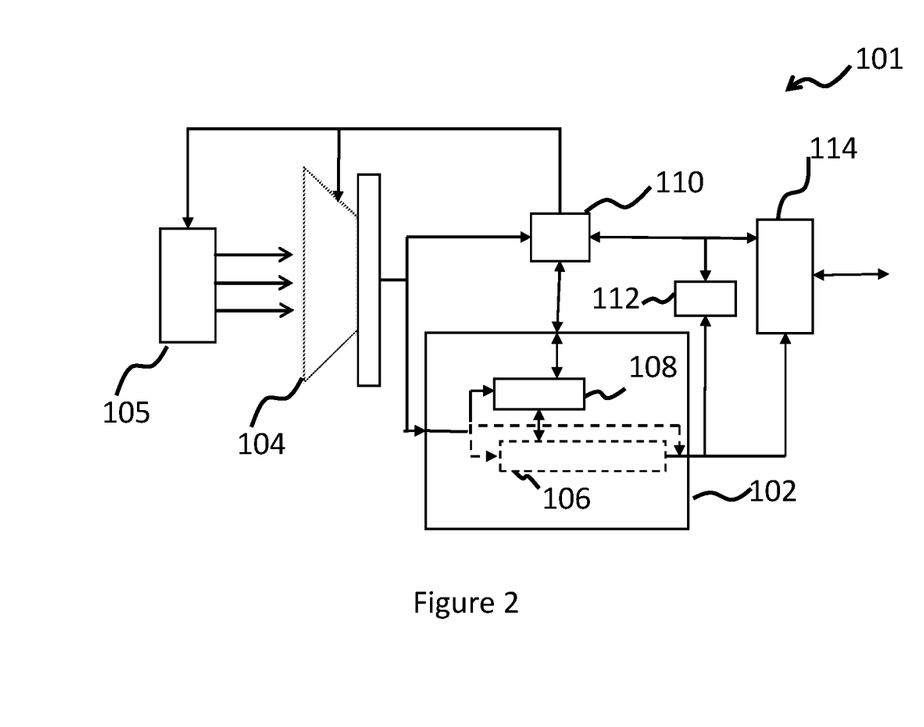
FIG. 2 shows schematically an apparatus to process image data according to an embodiment.

FIG. 2 shows schematically an apparatus 101 according to an embodiment.

Like features described above in FIG. 1 will use feature numbers incremented by 100 in FIG. 2. For example, apparatus 101 comprises ISP 102, image sensor 104, lens 105 (optional), one or more image processing blocks 106, one or more statistics data modules 108, processor component 110, and consumer component 112. In an embodiment the various features of the apparatus 101 (e.g. the image sensor, the ISP and/or the processor component) may be individual components communicating with each other via wired communications. In an alternative embodiment one or more of the features (e.g. the image sensor, the ISP and/or the processor component) may be embedded in the same System on Chip (SoC).

In the present illustrative embodiment, apparatus 101 may be provided to monitor a scene. As an example, apparatus 101 may be a home security device such as a doorbell monitor device positioned to monitor a scene (e.g. a user's front porch or a lobby of a building).

The apparatus 101 may be a resource constrained apparatus (e.g. battery powered as opposed to mains powered), where such a resource constrained apparatus could use the ISP image processing blocks 106 to process image sensor data from the image sensor to detect an event in a monitored scene, but, as set out above, such functionality could drain the resources of the resource constrained apparatus (e.g. power, processing, memory).

In accordance with an embodiment, the operation of the apparatus 101 is modified to take account of the resource constraints of the apparatus 101.

The ISP 102 is controlled to operate in a first, low-power mode, such that, for example, circuitry or components in the ISP pipeline which are not required for a particular application may be rendered inactive e.g. by bypassing those ISP components or where possible, disabling the ISP components via clock-gating or power-gating. Furthermore, in the ISP may not pass any data or may pass only a limited amount of data to consumer component 112 when operating in the low-power mode in comparison to when operating in a high-power mode.

In the illustrative example of FIG. 2, active components of the ISP 102 pipeline include the one or more statistics data modules 108 and any other components that may be required to pre-process or format the image sensor data to enable the one or more statistics data modules 108 to process the image sensor data.

In operation, rather than using one or more of the different types of statistics data (e.g. AE, AF, AWB statistics data) from the one or more statistics data modules 108 to improve the image quality and/or to actively control the functionality of the camera or lens as described above in FIG. 1, the statistics data is used to detect an event in a scene, and to trigger an action e.g. in response to an event being detected.

Given the image sensor data is processed by the one or more statistics data modules such that other portions of the ISP pipeline can be deactivated (e.g. bypassed or disabled), the event detection using statistics data from the one or more statistics data modules can be performed by resource constrained devices.

Furthermore, the statistics data is generated by statistics data modules of existing ISPs so no modification of the ISP IP core is required to provide the event detection functionality described herein.

Events detectable in a scene may relate to detecting motion in a scene or detecting a change in the characteristics of light in a scene, and could for example be one or more of:
    an object or figure (person or animal) entering or leaving the scene;
    an object or figure moving towards or away from the camera;
    a light turning on or off;

It will be appreciated that the events in the above list are exemplary only and the list is not exhaustive.

As will be described below, a statistics data module 108 receiving an array of image sensor pixel values corresponding to an image frame (e.g. corresponding to image sensor data) will, using one or more algorithms, generate corresponding statistics data (e.g. an array of values, a histogram etc.) for the array, where the size or resolution of the statistics data output from the statistics data module is reduced in comparison to the size of the array of pixel values provided as an input thereto. The statistics data generated by a statistics data module may be derived, at least in part, from the image sensor data. The resulting statistics data may comprise one or more zones of values, where, for example (e.g. for AE statistics data), the values derived for a single zone may be considered to be an aggregate (typically sum, mean, or histogram) of the pixel values at a corresponding pixel location in the image sensor data. For other types of statistics data (e.g. AWB statistics data and AF statistics data) the aggregated values at each pixel location may not be "pixel values" that are used directly, but some function of the pixel values within a neighbourhood of a pixel location.

Furthermore, a statistics data module receiving a stream of image sensor data output from the image sensor 104 will, for example, using one or more algorithms, generate a stream of statistics data of one or more types corresponding to the arrays of image sensor pixel values in the stream of image sensor data. Thus, the statistics data of a particular type (e.g. AE-, AF-, AWB-statistics data) may be generated on a per frame basis.

The statistics data corresponding to each array of image sensor pixel values in the image sensor data may be stored in storage (e.g. in storage at the further processing component).

The further processor component 110 receiving statistics data from a statistics data module can then compare statistics data for a latest frame processed by the statistics data module to stored statistics data corresponding to one or more previous frames. An event may be detected, for example by identifying any differences between the statistics data for the latest frame and the one or more previous frames.

For example, the further processor component 110 receiving statistics data of a first type (e.g. AF statistics data) from an AF-statistics data module 108 may, using one or more algorithms, generate a model comprising a mean and variance for one or more arrays of the AF statistics data and determine whether an event was detected in one of those arrays of values.

In an illustrative embodiment, the auto-focus statistics data module may generate statistics data comprising an array of 15×15 value(s) entries, with each entry having at least two values: E2 (the sum of squared edge/contrast responses) & I2 (the sum of squared intensities).

The further processor component 110 may, using the one or more algorithms, compute contrast statistics (E2/I2) to provide a measure of contrast which is luminance invariant (i.e. where the auto-focus system is robust against changes in lighting or exposure settings that occur while focusing), where a change in the level of contrast may be taken to be indicative of an event.

Furthermore, the intensity statistics (I2) could be used by themselves to detect the event (e.g. indicative of a light turning on or off).

Additionally, or alternatively, the further processor component 110 could use both of these at the same time, for example using one to corroborate detections from the other to increase robustness.

The further processor component 110 may also use the AF statistics data to determine whether an event is detected in the focal plane of the camera (the ranges at which the lens is focussed), or at a distance too close to be relevant (e.g. indicative of rain on lens, or an insect crawling on lens) or too far to be relevant (e.g. indicative of traffic on the other side of the street).

Furthermore, when a significant portion of the AF statistics data are at the same value (e.g. low level) for a protracted period of time, this may be taken to indicate that there is something partially occluding the lens, such as dirt or rain, which could be used to trigger an alert to the user to clean the lens.

Similarly, a histogram from an AE statistics data module may be provided as statistics data of a second type (e.g. AE statistics data) and may be used to determine whether the image sensor is partially or completely occluded.

A third statistics data type (e.g. AWB statistics data (which are generally used to represent the dominant hue of each zone)), may be used to distinguish, for example, between skin tones and non-skin tones. This may help to detect motion events resulting from a face or an animal entering a scene.

Thus, it will be seen that the different types of statistics data (e.g. AF-, AE, AWB-statistics data) can be used to detect an event in a scene, or to be used to derive further information about the event.

Furthermore, the sensitivity of detection in a particular area of a scene may be defined by a user, e.g. via a user interface (UI) (not shown) on apparatus 201, where a user may specify the apparatus to be more or less sensitive to specific areas of a scene.

As an example, should the user of the apparatus want to omit certain areas of a scene from being monitored, the areas could be overlayed as zones on an image frame, to show, e.g. via a display on the UI during a set-up operation, which area of the scene each zone covers and to allow the user to select/deselect particular zones from being monitored or to assign a level of importance to each zone.

The further processor component 110 may comprise an NPU whereby statistics data from one or more ISP statistics data modules may be provided as an input to a neural network (NN) implemented thereon and trained to detect an event during an inference operation.

The NPU may, using the NN, distinguish between different types of events—for example for a smart doorbell device the NN may distinguish between objects moving toward the camera and objects moving away, or between large objects and small objects, or when a light is turned on or off.

Any suitable NN may be used such as a feed forward fully connected neural network or a recurrent neural network.

On determining that an event is detected within the scene the further processor component 110 may initiate an action as will be described in greater detail below.

In the low-power operation mode the image sensor 104 may be controlled to operate at a relatively low frame rate (e.g. <10 fps) compared to a different operation mode (e.g. high-power operation mode) in which the image sensor may operate at a higher frame rate (e.g. >10 fps up to e.g. 60 fps.).

Additionally, or alternatively, when the apparatus operates in low-power mode, the image sensor 4 may modify the sensor data to reduce or mitigate the burden on the resources to process/store the image sensor data (e.g. in the ISP) in comparison to when the apparatus operates in a high-power mode. For example, the image sensor data output from the image sensor when the apparatus is operating in low-power mode may be reduced in size and/or resolution in comparison to the image sensor data output from the image sensor when the apparatus is operating in a relatively high-power mode.

Apparatus 101 may comprise wired and/or wireless communication circuitry 114 which may be used to communicate with a remote resource (e.g. a server or device). Such communication circuitry may comprise, for example, a Bluetooth or BLE transmitter or a long range (LoRa) transmitter although the claims are not limited in this respect.

Figure 3:
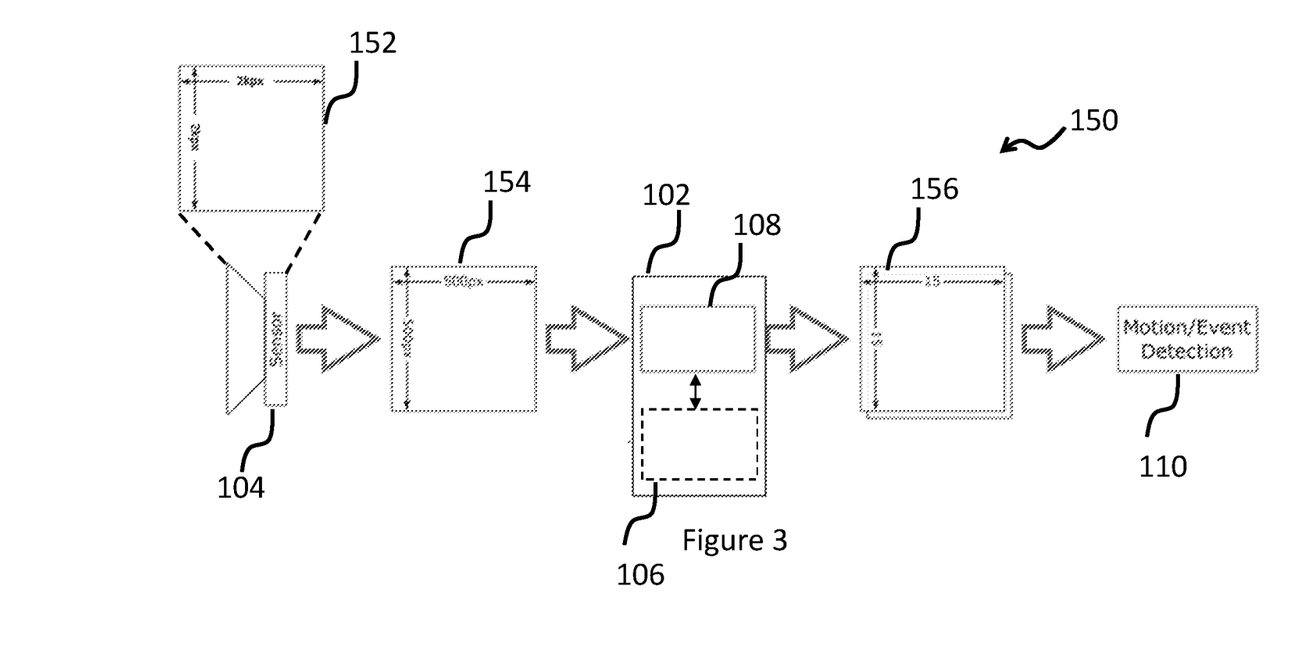
FIG. 3 shows an example of sensor data, image sensor data and statistics data.

FIG. 3 shows an example of sensor data captured by image sensor 104 and subsequently processed to generate statistics data for event detection.

In operation, image sensor 104 (e.g. a video camera) generates initial sensor data 152 (of which one 2 k pixel×2 k pixel array relating to a frame is depicted in FIG. 3). Whilst only one array is depicted in FIG. 3, such initial sensor data 152 may be a stream of arrays of initial sensor pixel values relating to a stream of frames in a video stream.

The image sensor 104 processes the initial sensor data 152 to generate image sensor data 154, where the image sensor data is modified (e.g. reduced in size or resolution) in comparison to the initial sensor data 152. Such modification may comprise, for example, binning, cropping, filtering or otherwise. Image sensor data is depicted to be a 500 pixel× 500 pixel array in FIG. 3.

As above, a portion of the ISP pipeline may be rendered inactive (e.g. by bypassing those ISP components or circuitry or where possible, disabling the ISP components or circuitry via clock-gating or power-gating). FIG. 3 depicts the one or more image processing blocks 106 as being disabled by the dashed line in FIG. 3 although in some embodiments the one or more image processing blocks 106 may be required to operate with some reduced functionality so as to pre-process or format the image sensor data to enable the one or more statistics data modules 108 to process the image sensor data.

Furthermore, when operating in a low-power mode the ISP processing blocks may pass no data or limited amounts of data to a consumer component in comparison to when operating in a high-power mode.

The image sensor data 154 is processed by the one or more statistics data modules 108 to generate statistics data 156.

For example, the statistics data may be a first statistics data type (e.g. AF statistics data), where the AF statistics data comprises m×n or n×n entries in an AF array (depicted as an array of 15×15 entries in FIG. 3). In an embodiment, each entry may comprise at least two values, a first value comprising a cumulation of edge measurements of a corresponding array of pixel values of the image sensor data 154, and a second value comprising a cumulation of intensity values of the corresponding array of pixel values of the image sensor data 154.

In a further example, the statistics data 156 may comprise a different statistics data type (e.g. AWB statistics data or AE statistics data), e.g., where an array of pixel values of image sensor data array 154 is partitioned to one or more histogram bins (e.g., 4×256 bins).

In an embodiment, the further processor component 110 may process all or a subset of the statistics data to determine whether or not an event is detected in the scene. For example, the further processor component 110 may use AF statistics data to detect an event (e.g. motion event) in the AF array.

An event may be detected by analyzing one or more AF arrays. For example, the most recent generated AF array (representative of the most recent frame of a video stream) may be compared to previously generated AF array (representative of one or more previous frames of a video stream), where any difference between the most recent AF array and a previously generated AF array may be indicative of an event.

Once the event is detected, statistics data generated by a further statistics data module 108 may be used to derive further information (e.g. insight or context) about the event. For example, the further processor component 110 may use AE statistics data to determine if there was an illuminance across the whole or part of the frame in which an event was detected and/or by comparing multiple frames the direction from which the illuminance originated. Illuminance may be indicative, for example, of a vehicle entering the scene or a light turning on in the scene.

In an embodiment the ISP 2 may be provided with circuitry to reduce the size and/or resolution of the image sensor data 154. However, as such size and/or resolution reduction functionality will consume resources on the ISP (e.g. power, memory), it may be preferred to use the image sensor 104 to perform such reductions before outputting the image sensor data 154 to the ISP 102.

Figure 4A:
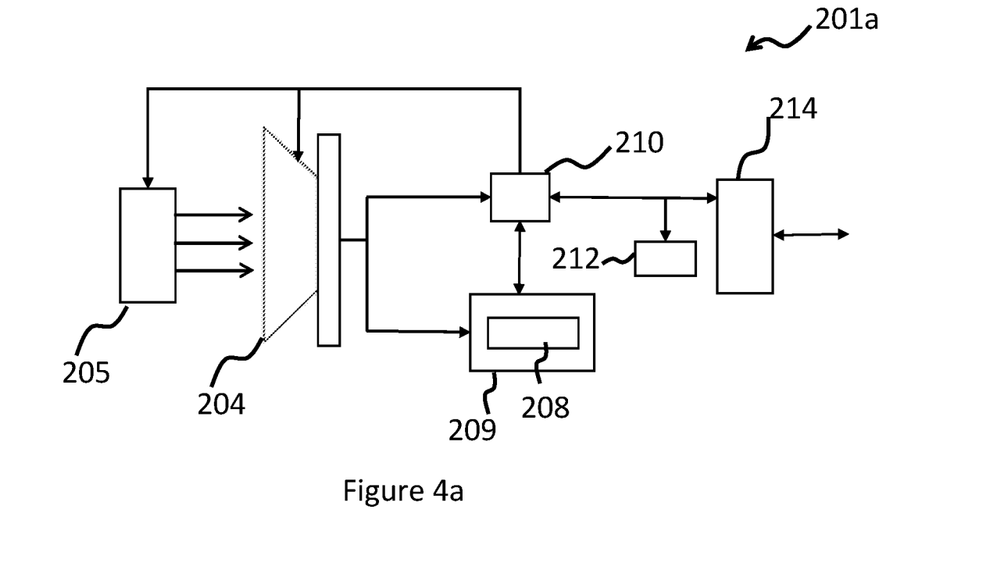
FIG. 4a schematically shows an apparatus to process image data according to an embodiment.
Figure 4B:
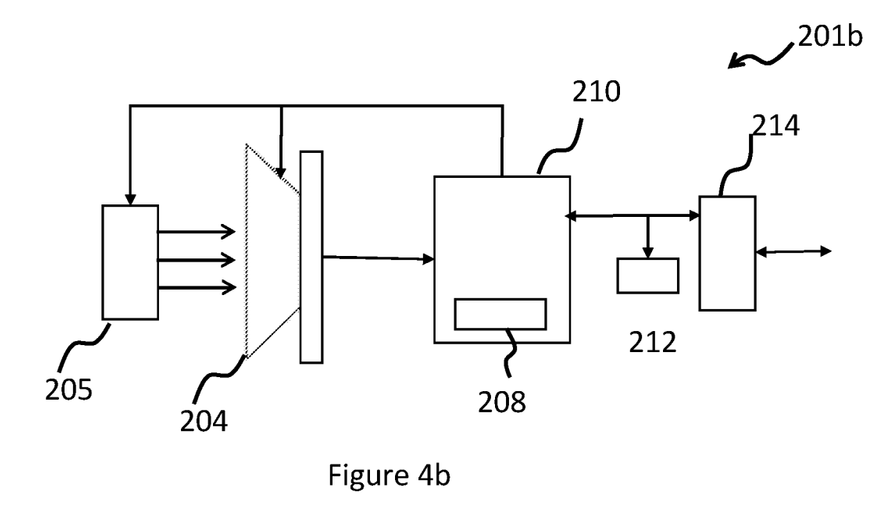
FIG. 4b schematically shows an apparatus to process image data according to a further embodiment.

FIG. 4a schematically shows an apparatus 201a according to an embodiment and FIG. 4b schematically shows an apparatus 201b according to a further embodiment.

Like features described above in relation to FIGS. 2 and 3 will use feature numbers incremented by 100 in FIGS. 4a and 4b. For example, apparatus 201a in FIG. 4a and apparatus 201b in FIG. 4b comprise image sensor 204, lens 205 (optional), one or more statistics data modules 208, processor component 210, consumer component 212.

As above in FIG. 2, apparatus 201a & 201b may each be a resource constrained apparatus to monitor an event in a scene.

The apparatus 201a differs from the apparatus depicted in FIG. 2 in that the one or more statistics data modules 208 are integrated into a dedicated statistics component 209 and are not part of an ISP.

The apparatus 201b differs from the apparatus depicted in FIG. 1 in that the one or more statistics data modules 208 are integrated into the processing component 210.

Thus, the apparatus 201a of FIG. 4a and the apparatus 201b of FIG. 4b may be substantially dedicated to monitoring for event(s) and may provide relatively limited image signal processing functionality compared to the apparatus comprising the ISP in FIG. 2.

As above in FIGS. 2 & 3, the image sensor 204 provides image sensor data to the one or more statistics data modules 208. The one or more dedicated statistics data modules 208 process the image sensor data to generate statistics data of one or more different types (e.g. AE-, AF-, AWB-statistics data) in response thereto.

Processing component 210 processes the statistics data to determine whether or not an event is detected in the scene based on or in response to the statistics data.

On determining that an event is detected, the processor component 210 may initiate an action as will be described in greater detail below.

Figure 5:
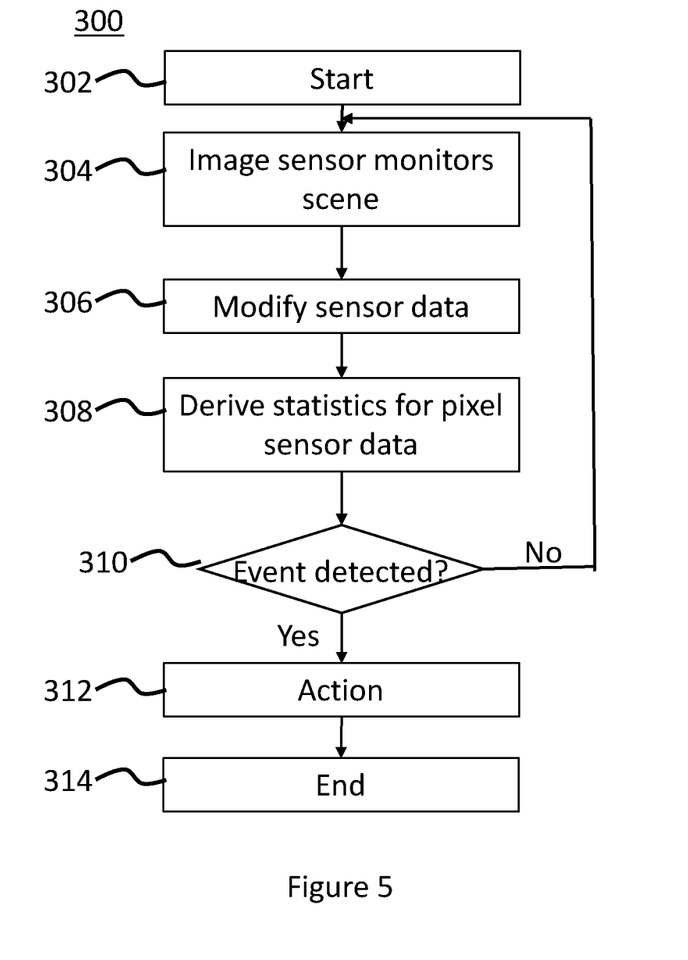
FIG. 5 shows an exemplary method of monitoring a scene to detect an event therein in accordance with an embodiment.

FIG. 5 shows an exemplary method of detecting an event in an accordance with an embodiment.

At S302 the method starts.

At S304 an image sensor monitors a scene and generates initial sensor data. Such sensor data may be relatively large in size/resolution e.g. an array comprising 2 k×2 k initial sensor pixel values.

At S306 the image sensor modifies the initial sensor data (e.g. by reducing the size and/or resolution of the sensor data (e.g. by way of binning, cropping, sampling processes)) and outputs image sensor data.

At S308 one or more statistics data modules of a processing component (e.g. an ISP) are used to process the image sensor data to generate statistics data which are derived, at least in part, from the image sensor data.

At 310 a further processing component (e.g. CPU, MCU, NPU) processes the statistics data to determine whether or not an event is detected in the scene based on or in response to processing the statistics data. Such a determination may be made by comparing statistics data relating to a current frame to statistics data relating to one or more previous frames and identifying one or more differences between the statistics data for the current frame and the one or more previous frames.

When no event is detected the process repeats.

When an event is detected in the scene an action is initiated, for example, by further processor component (at S312). Example actions are set out below.

The method ends as at S314.

Example Actions

When an event is detected in the scene, any suitable action may be taken at the apparatus.

For example, on determining that an event did occur, a processing component may generate a signal, hereafter "event signal".

The event signal may be a p-bit signal (where 'p' is an integer), which causes another processor component on the apparatus to perform a particular function in response to receiving the event signal.

As an illustrative example, the event signal may cause a resource (e.g. the apparatus or processing components on the apparatus) operating in a first mode or configuration (e.g. a relatively low-power mode) to switch to a second mode or configuration (a relatively high-power mode).

Such an event signal may cause the image sensor to increase the resolution of the image sensor data output to the ISP, to increase the resolution and/or increase the frame rate at which frames are captured by the sensor, and correspondingly increase the speed at which image sensor data is provided to the ISP.

Such an event signal may re-enable parts of the ISP pipeline that were disabled (e.g. bypassed or deactivated)

such as the one or more ISP processor blocks to process the image sensor data and/or to provide an output to a consumer component.

As a further illustrative example, the event signal may cause the apparatus to communicate, via communication circuitry, with a remote resource (e.g. device or server) to provide the remote resource with details about the event. For example, the event signal transmitted to the remote resource may be encoded with information about the event or with the statistics data used to determine that the event occurred to allow the remote resource to process the statistics data to verify that the event occurred.

The event signal may comprise an indicative confidence score in relation to the detected event, the value of which is used to enable different resources (e.g. components or circuitry such as communication circuitry, a video encoder, a user interface etc.) on the apparatus or remote resources (e.g. a server, an alarm) based on or in response to the confidence score.

In examples, the event signal may be used as an input to a NPU, which, depending on the confidence score may determine which resources to enable.

In addition, or as an alternative to a confidence score, the event signal could indicate one or more details about the detected event. For example, the event signal could indicate that the event relates to motion detected in the scene, and may provide further information on the type of motion detected (e.g. direction of motion (e.g. towards or away) from the image sensor). Additionally, or alternatively, the event signal could indicate that the event relates to detection of an object, person or animal in the scene (e.g. person, dog, cat, vehicle) and may provide information about that object, person or animal (e.g. colour, size).

Additionally, or alternatively, the event signal could indicate that the event relates to detection of light in the scene and may provide information on the light detected (e.g. the light being turned on or off; the length of time the light was detected in the scene; colour; brightness etc.).

A resource, local (e.g. NPU) or remote (e.g. server) receiving the event signal may turn on further circuitry or components depending on the detected event. For example, an NPU may, on determining a person is in proximity to the image sensor, cause a speaker to generate an audible alarm or to turn on a light in the environment as a deterrent for a potential intruder.

Additionally or alternatively, the remote server may notify a user of the event (via a user's mobile device) and provide a communications channel between the apparatus and the user's device. For example, the server may cause a microphone and speaker to be enabled on the apparatus to allow a user to converse with the person in proximity to the apparatus.

As described above, in some embodiments the image sensor data generated by the image sensor may be stored in storage (not shown) at the apparatus. Such storage may be located on the ISP, the further processor component or elsewhere. Thus, when an event is detected, some or all of the image sensor data in storage (e.g. image sensor data based on which the event was detected) may be provided to the user (e.g. via a UI on the apparatus or transmitted to a remote resource to be presented to the user).

In embodiments, the actions taken by a resource (e.g. image sensor, ISP, server) in response to a particular event signal may be predefined e.g. by instructions in storage accessible by the respective resources.

Additionally, or alternatively, the action to be taken on detection of particular event may be defined by a user, e.g. via a user interface (UI) (not shown) on the apparatus 201, where a user may specify an event or events that can be ignored and/or to specify particular actions to be taken in response to a particular event or events being detected.

Figure 6:
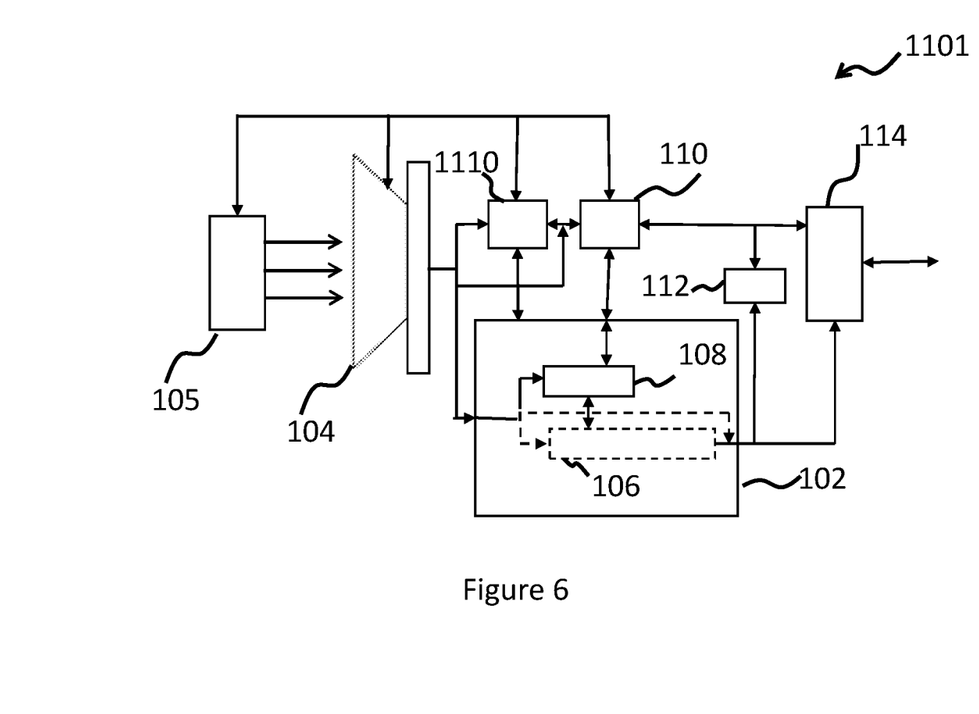
FIG. 6 shows schematically an apparatus to process image data according to an embodiment.

FIG. 6 shows schematically an apparatus 1101 according to an embodiment.

Like features described above in FIG. 2 will use the same feature numbers as in FIG. 2. For example, apparatus 1101 comprises ISP 102, image sensor 104, lens 105 (optional), one or more image processing blocks 106, one or more statistics data modules 108, processor component 110, and consumer component 112.

Apparatus 1101 also comprises further processor component 1110, where further processor component 1110 may provide different functionality in comparison to the processor component 110. For example, further processor component 1110 may be a CPU, and processor component 110 may be an MCU, NPU or an ASIC.

In accordance with an embodiment, the processor component 110 may be used to monitor for an event using statistics data from the ISP 102 when the apparatus 1101 is set to operate in a first mode (e.g. low-power mode) and the further processor component may be used to control the ISP 102 when the apparatus 1101 operates in a second mode (e.g. high power mode).

For example, when an event is detected by the processor component 110 processing statistics data in the low-power mode, the processor component 110 may generate an event signal to cause the further processor component 1110 to, for example, perform more powerful image processing using the one or more processing blocks of the ISP 102 (e.g. to provide further insight into the detected event).

In a further embodiment, an apparatus may comprise two or more ISPs, where a first ISP may be used to process image sensor data when the apparatus is set to operate in a low-power mode and a second ISP may be used to process image sensor data when the apparatus is set to operate in a high-power mode.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional elements labeled as a "block," "module" or "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

Some aspects and features of the disclosed embodiments are set out in the following numbered items:

1) A method of processing image data at an apparatus having an image sensor, a first statistics data module and a first processor component, the method comprising:
   obtaining, at the first statistics data module from the image sensor, first image sensor data;
   generating, at the first statistics data module, statistics data of a first type derived, at least in part, from the first image sensor data;
   processing, at the first processor component, the statistics data of the first type to determine whether or not an event is detected in a scene;
   generating, at the first processor component, an event signal when an event is detected.
2) The method of any preceding item, wherein processing the statistics data of the first type to determine whether or not an event is detected comprises:
   comparing the statistics data of the first type corresponding to a latest frame processed by the statistics data module to stored statistics data corresponding to one or more previous frames;
   detecting an event in the scene in response to one or more differences between the statistics data of the first type corresponding to the latest frame and the stored statistics data corresponding to the one or more previous frames.
3) The method of any preceding item, further comprising:
   generating, using a second statistics data module, statistics data of a second type in response to the image sensor data.
4) The method of item 3 further comprising:
   processing, at the first processor component, the statistics data of the second type to derive further information about the detected event.
5) The method of any preceding item, wherein the apparatus is to operate in a first mode or a second mode, where the first mode comprises a relatively low-power mode of operation and the second mode comprises a relatively high-power mode of operation.

6) The method of item 5, further comprising, switching the apparatus from the first mode to the second mode based on or in response to the event signal.

7) The method of item 5 or item 6, where the image sensor is controlled to operate at a low frame rate when the apparatus is in the first mode in comparison to when the apparatus is in the second mode.

8) The method of any of items 5 to 7, where the image sensor is controlled to generate image sensor data having a lower size or resolution when the apparatus is in the first mode in comparison to when the apparatus is in the second mode.

9) The method of any preceding item, comprising:
capturing, at the image sensor, one or more image frames and generating initial sensor data comprising one or more arrays of initial sensor pixel values corresponding to the one or more image frames.

10) The method according to item 9, further comprising:
generating, at the image sensor, the first image sensor data, where the first image sensor data comprises one or more arrays of image sensor pixel values corresponding to the one or more initial sensor pixel values.

11) The method according to item 10, where one or both of the size and/or resolution of the one or more arrays of image sensor pixel values are lower than the corresponding one or more arrays of initial sensor pixel values.

12) The method of any preceding item, where the event is one of detecting motion in the scene or detecting a change in the characteristics of light in the scene.

13) The method of any of items 3 to 12, wherein the statistics data of the first type or the statistics data of the second type comprise one of: auto-exposure statistics data, auto-focus statistics data and auto-white-balance statistics data.

14) The method of any preceding item, where processing the statistics data to determine whether or not an event is detected in the scene comprises processing the statistics data using a neural network to determine whether or not the event is detected.

15) The method of any preceding item, further comprising:
obtaining, at the statistics data module from the image sensor, second image sensor data;
generating, at the statistics data module, further statistics data of the first type derived, at least in part, from the second image sensor data;
processing, at the first or at a second processor component, the further statistics data; and
controlling the apparatus based on or in response to the further statistics data.

16) The method of item 15, where the apparatus is set to operate in the second mode.

17) The method of any preceding item, where the apparatus comprises an image signal processor, where the image signal processor comprises the statistics data module and one or more image processor blocks comprising circuitry to generate image data for a consumer component.

18) The method of item 17, wherein at least a portion of the circuitry of the one or more processor blocks is deactivated when the apparatus is in the first mode in comparison to when the apparatus is in the second mode.

19) The method of any of items 15 to 18, where controlling the apparatus comprises: modifying the operation of the one or more image processing blocks based on or in response to the further statistics data derived, at least in part, from the second image sensor data.

20) The method of any of items 15 to 19, where controlling the apparatus based on or in response to the further statistics data comprises:
controlling the operation of the image sensor and/or controlling the operation of a lens associated with the image sensor.

21) An apparatus to process image data comprising:
a statistics data module to:
obtain, from an image sensor, image sensor data;
generate statistics data derived, at least in part, from the image sensor data;
provide, to a first processor component, the statistics data to enable the first processor component to determine whether or not an event is detected in a scene based on or in response to the statistics data.

22) The apparatus of item 21, further comprising first processor component.

23) The apparatus of item 21 or item 22, comprising an image signal processor, where the image signal processor comprises the statistics data module and one or more processor blocks to process the image sensor data to generate image data for a consumer component.

24) The apparatus of item 23, where the first processor component is to control the operation of the one or more image processing blocks based on or in response to the statistics data derived, at least in part, from the second image sensor data.

25) A non-transitory computer-readable medium comprising machine-readable code which, when executed by a processor, causes the processor to perform the method of any of items 1-20.

The invention claimed is:

1. A method of processing image data at an apparatus having an image sensor, a first statistics data module and a first processor component, the method comprising:
obtaining, at the first statistics data module from the image sensor, first image sensor data;
generating, at the first statistics data module, statistics data of a first type derived, at least in part, from the first image sensor data;
processing, at the first processor component, the statistics data of the first type to determine whether or not an event is detected in a scene;
generating, at the first processor component, an event signal when an event is detected,
wherein the apparatus is to operate in a first mode or a second mode, where the first mode comprises a low-power mode of operation and the second mode comprises a high-power mode of operation, the high-power mode of operation requiring more power than the low-power mode of operation,
the method further comprising:
switching the apparatus from the first mode to the second mode based on or in response to the event signal and
controlling the image sensor to operate at a low frame rate when the apparatus is in the first mode, the low frame rate being lower in comparison to a frame rate when the apparatus is in the second mode.

2. The method of claim 1, wherein processing the statistics data of the first type to determine whether or not an event is detected comprises:

comparing the statistics data of the first type corresponding to a latest frame processed by the statistics data module to stored statistics data corresponding to one or more previous frames;
detecting an event in the scene in response to one or more differences between the statistics data of the first type corresponding to the latest frame and the stored statistics data corresponding to the one or more previous frames.

3. The method of claim 1, further comprising:
generating, using a second statistics data module, statistics data of a second type in response to the image sensor data.

4. The method of claim 3, further comprising:
processing, at the first processor component, the statistics data of the second type to derive further information about the detected event.

5. The method of claim 1, where the image sensor is controlled to generate image sensor data having a lower size or resolution when the apparatus is in the first mode in comparison to when the apparatus is in the second mode.

6. The method of claim 1, comprising:
capturing, at the image sensor, one or more image frames and generating initial sensor data comprising one or more arrays of initial sensor pixel values corresponding to the one or more image frames.

7. The method of claim 6, further comprising:
generating, at the image sensor, the first image sensor data, where the first image sensor data comprises one or more arrays of image sensor pixel values corresponding to the one or more initial sensor pixel values.

8. The method of claim 1, where the event is one of detecting motion in the scene or detecting a change in the characteristics of light in the scene.

9. The method of claim 1, where processing the statistics data to determine whether or not an event is detected in the scene comprises processing the statistics data using a neural network to determine whether or not the event is detected.

10. The method of claim 1, further comprising:
obtaining, at the statistics data module from the image sensor, second image sensor data;
generating, at the statistics data module, further statistics data of the first type derived, at least in part, from the second image sensor data;
processing, at the first or at a second processor component, the further statistics data; and
controlling the apparatus based on or in response to the further statistics data.

11. The method of claim 1, where the apparatus comprises an image signal processor, where the image signal processor comprises the statistics data module and one or more image processor blocks comprising circuitry to generate image data for a consumer component.

12. The method of claim 11, wherein at least a portion of the circuitry of the one or more processor blocks is deactivated when the apparatus is in the first mode in comparison to when the apparatus is in the second mode.

13. The method of claim 10, where controlling the apparatus comprises: modifying the operation of the one or more image processing blocks based on or in response to the further statistics data derived, at least in part, from the second image sensor data.

14. The method of claim 10, where controlling the apparatus based on or in response to the further statistics data comprises:
controlling the operation of the image sensor and/or controlling the operation of a lens associated with the image sensor.

15. An apparatus to process image data, wherein the apparatus is to operate in a first mode or a second mode, where the first mode comprises a low-power mode of operation and the second mode comprises a high-power mode of operation, the high-power mode of operation requiring more power than the low-power mode of operation, the apparatus comprising:
a statistics data module to:
obtain, from an image sensor, image sensor data;
generate statistics data derived, at least in part, from the image sensor data;
provide, to a first processor component, the statistics data to enable the first processor component to determine whether or not an event is detected in a scene based on or in response to the statistics data;
where the apparatus is to switch from the first mode to the second mode based on or in response to the event signal and to control the image sensor to operate at a low frame rate when the apparatus is in the first mode, the low frame rate being lower in comparison to a frame rate when the apparatus is in the second mode.

16. The apparatus of claim 15, further comprising first processor component.

17. A non-transitory computer-readable medium comprising machine-readable code which, when executed by a processor, causes the processor to perform the method of claim 1.

* * * * *